(12) United States Patent
Qiang et al.

(10) Patent No.: US 11,042,228 B2
(45) Date of Patent: Jun. 22, 2021

(54) LOW-POWER WRITTEN INPUT FOR AN ELECTRONIC DEVICE

(71) Applicant: Samsung Electronics Co., Ltd., Suwon-si (KR)

(72) Inventors: Sheng Qiang, Lenexa, KS (US); Aaron Jackson, Olathe, KS (US)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 14/812,858

(22) Filed: Jul. 29, 2015

(65) Prior Publication Data

US 2017/0031466 A1 Feb. 2, 2017

(51) Int. Cl.
*G06F 3/0354* (2013.01)
*G06F 3/0488* (2013.01)
(Continued)

(52) U.S. Cl.
CPC ........ *G06F 3/03545* (2013.01); *G06F 1/3215* (2013.01); *G06F 3/0488* (2013.01);
(Continued)

(58) Field of Classification Search
CPC .. G06F 3/0488; G06F 3/03545; G06F 1/1643; G06F 1/1694; G06F 1/3203; G06F 1/3231; G06F 1/3262; G06F 21/31; G06F 2200/1637; G06F 3/0346; G06F 3/0482; G06F 3/0484; G06F 3/04883; G06F 3/04886

See application file for complete search history.

(56) References Cited

U.S. PATENT DOCUMENTS 5,194,852 A 3/1993 More et al.
2003/0051182 A1* 3/2003 Tsirkel ................. G06F 1/3203
713/320
(Continued)

FOREIGN PATENT DOCUMENTS

EP 2 693 359 A2 2/2014
JP 2014194643 A 10/2014
(Continued)

OTHER PUBLICATIONS

European Patent Office, "European Search Report," Application No. 16159711.7, dated Nov. 30, 2016, 8 pages, publisher EPO, Munich, Germany, Place of Search, The Hague.
(Continued)

*Primary Examiner* — Kenneth Bukowski

(57) ABSTRACT

A method, electronic device, and computer-readable medium for displaying a user input. The method includes determining whether a writing utensil is within a predetermined proximity of the display panel while a display panel of the electronic device is powered off. The method also includes, in response to determining that a writing utensil is within the predetermined proximity, activating a black screen display mode for the display panel. Additionally, the method includes, in response to detecting the writing utensil contacting a surface of the electronic device, activating individual pixels corresponding to locations where the writing utensil contacted the electronic device to display a contrasting color.

20 Claims, 4 Drawing Sheets

(51) Int. Cl.
  *H04W 52/02* (2009.01)
  *G06F 1/3215* (2019.01)

(52) U.S. Cl.
  CPC ..... *H04W 52/027* (2013.01); *H04W 52/0254*
          (2013.01); *Y02D 30/70* (2020.08)

(56) References Cited

U.S. PATENT DOCUMENTS

| | | | |
|---|---|---|---|
| 2004/0141647 A1* | 7/2004 | Kisuki | G06F 1/3296 |
| | | | 382/187 |
| 2008/0316186 A1 | 12/2008 | O'Brien | |
| 2009/0251422 A1* | 10/2009 | Wu | G06F 3/04886 |
| | | | 345/173 |
| 2012/0242634 A1 | 9/2012 | Maruyama et al. | |
| 2013/0002729 A1* | 1/2013 | Lee | G09G 3/20 |
| | | | 345/690 |
| 2013/0082937 A1* | 4/2013 | Liu | G06F 1/3262 |
| | | | 345/173 |
| 2013/0111579 A1* | 5/2013 | Newman | G06F 3/0488 |
| | | | 726/17 |
| 2014/0126823 A1* | 5/2014 | St. Jacques | G06K 9/00442 |
| | | | 382/187 |
| 2016/0227022 A1* | 8/2016 | Alameh | G06F 1/1684 |
| 2016/0301796 A1* | 10/2016 | Tuli | H04M 1/72563 |

FOREIGN PATENT DOCUMENTS

| | | |
|---|---|---|
| KR | 20140065048 A | 5/2014 |
| WO | 2014197247 A1 | 12/2014 |

OTHER PUBLICATIONS

European Patent Office Communication regarding Application No. 16159711.7, dated Mar. 14, 2018, 6 pages.

* cited by examiner

LOW-POWER WRITTEN INPUT FOR AN ELECTRONIC DEVICE

TECHNICAL FIELD

This disclosure relates generally to energy-efficient electronic devices. More specifically, this disclosure relates to a low-power written input for an electronic device.

BACKGROUND

People use their smart phones repeatedly throughout the day to accomplish many tasks. However, many people still are carrying a pen and paper in addition to their smart phones to write down ideas or take notes quickly. Often, people find it easier to carry pen and paper for note taking instead of using their smart phone, which may require turning on and unlocking their phone and then opening a note-taking application to enter notes.

Additionally, with all the things people use their smart phones for, battery life is frequently a concern even with larger batteries that are being used in smart phones. Powering the screen for the phone is one of the larger demands on battery power. In addition to the list of steps above that may need to be performed to use a smart phone for note taking, powering on the phone screen to take the notes also drains the battery power. For example, the phone may be running at full power for note taking, and battery consumption is high. Thus, in addition to needing to take several steps, using a smart phone to take notes when battery power is low may be undesirable.

SUMMARY

Embodiments of the present disclosure provide a low-power written input for an electronic device.

In one embodiment, a method of operating an electronic device to display is provided. The method includes determining whether a writing utensil is within a predetermined proximity of the display panel while a display panel of the electronic device is powered off. The method also includes, in response to determining that a writing utensil is within the predetermined proximity, activating a black screen display mode for the display panel. Additionally, the method includes, in response to detecting the writing utensil contacting a surface of the electronic device, activating individual pixels corresponding to locations where the writing utensil contacted the electronic device to display a contrasting color.

In another embodiment, an electronic device is provided. The electronic device includes a display panel and at least one processor. The at least one processor is configured to determine whether a writing utensil is within a predetermined proximity of the display panel while a display panel of the electronic device is powered off; activate, in response to a determination that a writing utensil is within the predetermined proximity, a black screen display mode for the display panel; and activate, in response to detecting the writing utensil contacting a surface of the electronic device, individual pixels corresponding to locations where the writing utensil contacted the electronic device to display a contrasting color.

In yet another embodiment, a non-transitory computer-readable medium is provided. The computer-readable medium includes comprising program code, that when executed by at least one processor, causes an electronic device to determine whether a writing utensil is within a predetermined proximity of the display panel while a display panel of the electronic device is powered off; activate, in response to a determination that a writing utensil is within the predetermined proximity, a black screen display mode for the display panel; and activate, in response to detecting the writing utensil contacting a surface of the electronic device, individual pixels corresponding to locations where the writing utensil contacted the electronic device to display a contrasting color.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The tell is "transmit," "receive," and "communicate," as well as derivatives thereof; encompass both direct and indirect communication. The terms "include" and "comprise," as well as derivatives thereof, mean inclusion without limitation. The term "or" is inclusive, meaning and/or. The phrase "associated with," as well as derivatives thereof; means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Embodiments of the present disclosure recognize that even with smart phones becoming very popular to use for a variety of functions, many people still carry pen and paper to jot down ideas, take quick notes, create a shopping list, etc. Although the smart phone provides the capability for the user to accomplish those tasks, most of time people may find it too cumbersome to pull out the phone, power it up, unlock the screen, find the application, open and then write to the application. Embodiments of the present disclosure recognize that for smart phones equipped with a stylus or pen, people should be able to write on their phones without the need to go through all those steps. Accordingly, embodiments of the present disclosure provide ways to remove or reduce those steps and allow a user to write on their phone right away. Embodiments of the present disclosure also provide a way to write on a screen of an electronic device, such as a smart phone, with the display powered off and the electronic device operating in lower power consumption mode.

Figure 1:
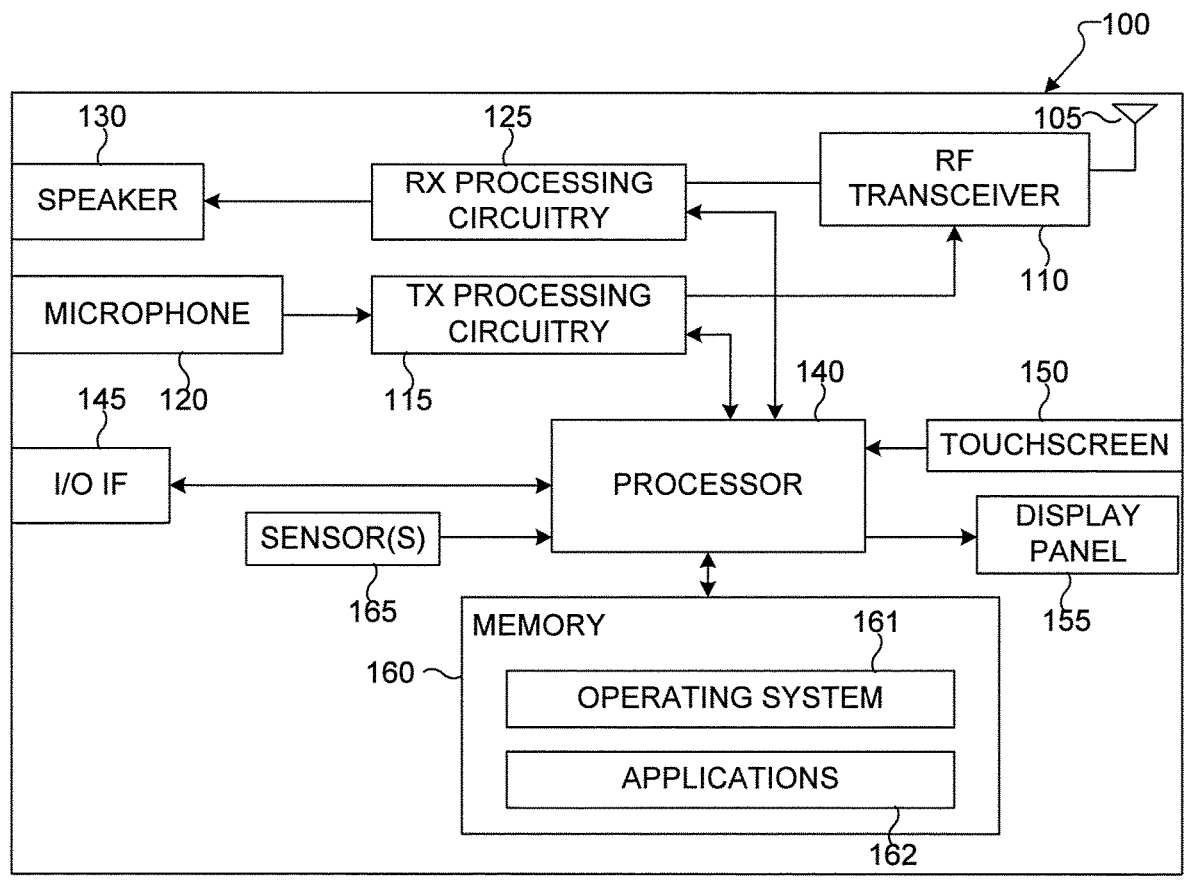
FIG. 1 illustrates an example electronic device according to embodiments of the present disclosure and in which embodiments of the present disclosure may be implemented.

FIG. 1 illustrates an example electronic device 100 according to embodiments of the present disclosure and in which embodiments of the present disclosure may be implemented. The embodiment of the electronic device 100 illustrated in FIG. 1 is for illustration only, the electronic device 100 comes in a wide variety of configurations, and FIG. 1 does not limit the scope of this disclosure to any particular implementation. For example, in various embodiments, the electronic device 100 may take different forms, and the present disclosure is not limited to any particular form. For example, without limitation, the electronic device 100 may be a user equipment (UE), a mobile station, a subscriber station, a wireless terminal, a smart phone, a tablet, a personal digital assistant (PDA), etc.

As shown in FIG. 1, the electronic device 100 includes an antenna 105, a radio frequency (RF) transceiver 110, transmit (TX) processing circuitry 115, a microphone 120, and receive (RX) processing circuitry 125. The electronic device 100 also includes a speaker 130, a processor 140, an input/output (I/O) interface (IF) 145, a touchscreen 150, a display panel 155, a memory 160, and one or more sensors 165. The memory 160 includes an operating system (OS) 161 and one or more applications 162.

The RF transceiver 110 receives, from the antenna 105, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The processor 140 can include one or more processors or other processing devices and execute the OS 161 stored in the memory 160 in order to control the overall operation of the electronic device 100. For example, the processor 140 could control the reception of forward channel signals and the transmission of reverse channel signals by the RF transceiver 110, the RX processing circuitry 125, and the TX processing circuitry 115 in accordance with well-known principles. In some embodiments, the processor 140 includes at least one microprocessor or microcontroller.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the electronic device 100 with the ability to connect to other devices, such as laptop computers and handheld computers. The I/O interface 145 is the communication path between these accessories and the processor 140.

The processor 140 is also coupled to the touchscreen 150 and the display panel 155. The operator of the electronic device 100 can use the touchscreen 150 to enter data and/or input into the electronic device 100, for example, with an electronic pen or a finger. The display panel 155 may be a liquid crystal display, a light-emitting diode (LED) display, an optical LED (OLED), an active matrix OLED (AMOLED), or other display capable of rendering text and/or graphics, such as from web sites, videos, games, etc. In some embodiments, the touchscreen 150 and the display panel 155 may be combined and/or integrated together, for example, in a Super AMOLED display.

The memory 160 is coupled to the processor 140. Part of the memory 160 could include a random access memory (RAM), and another part of the memory 160 could include a Flash memory or other read-only memory (ROM).

Electronic device 100 further includes one or more sensors 165 that can meter a physical quantity or detect an activation state of the electronic device 100 and convert metered or detected information into an electrical signal. For example, sensor 165 may include one or more buttons for touch input, a pen sensor for detecting removal of an electronic pen from a holder of the electronic pen in the electronic device 100, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein.

The touchscreen 150 can include a touch panel, a (digital) pen sensor, a key, or an ultrasonic input device. The touchscreen 150 can recognize, for example, a touch input in at least one scheme among a capacitive scheme, a pressure sensitive scheme, an infrared scheme, or an ultrasonic scheme. The touchscreen 150 can also include a control circuit. In the capacitive scheme, the touchscreen 150 can recognize touch or proximity.

As described in more detail below, the electronic device 100 may include circuitry for and applications for displaying a user input, for example, while the electronic device 100 is in a low-power mode. Although FIG. 1 illustrates one example of electronic device 100, various changes may be made to FIG. 1. For example, various components in FIG. 1 could be combined, further subdivided, or omitted, and additional components could be added according to particular needs. As a particular example, the processor 140 could be divided into multiple processors, such as one or more central processing units (CPUs) and one or more graphics processing units (GPUs). Also, while FIG. 1 illustrates the electronic device 100 configured as a mobile telephone, tablet, or smartphone; the electronic device 100 could be configured to operate as other types of mobile or stationary devices.

Figure 2A:
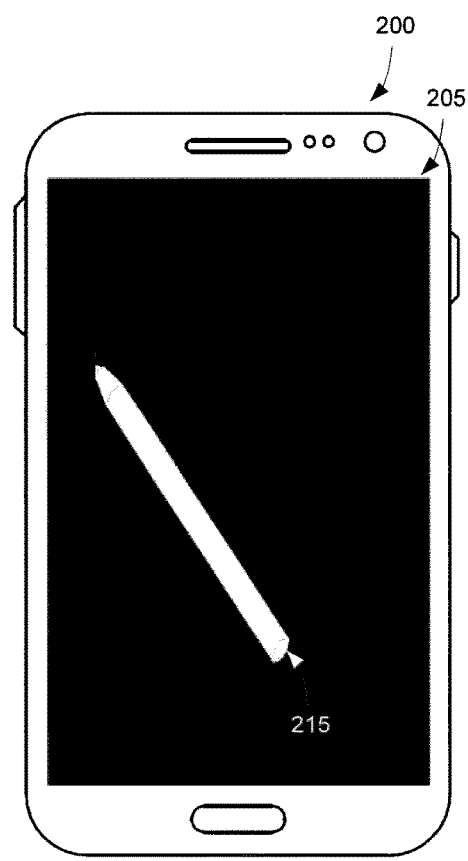
FIGS. 2A and 2B illustrate examples of a low-power written input on a screen of an electronic device according to embodiments of the present disclosure.
Figure 2B:
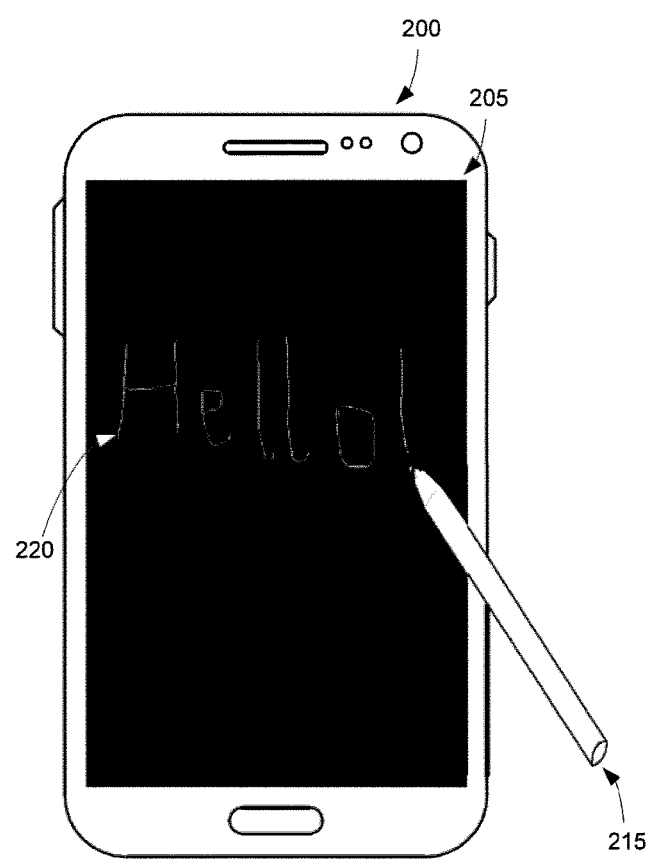

FIGS. 2A and 2B illustrate examples of a low-power written input on a screen 205 of an electronic device 200 according to embodiments of the present disclosure. For example, the electronic device 200 is an example of one embodiment of the electronic device 100, and the screen 205 may be an example embodiment of the touchscreen 150 and the display panel 155. Embodiments of the present disclosure provide a simple and easy way for a user of the electronic device to write on the screen directly without needing to first go through several steps and while saving power. As illustrated in FIG. 2A, the electronic device 200 displays the writing after the user pulls out an electronic pen 215 and hovers over the screen 205. The written input 220, for example, as illustrated in FIG. 2B is displayed as the user directly writes on the otherwise powered-off screen.

For example, when the electronic device 200 is idle, and the screen 205 (e.g., the display panel for the screen 205 as discussed in greater detail below) is powered off, the electronic device 200 detects when the pen 215 is detached from electronic device 200 or picked up if already detached and hovered over the screen 205. The electronic device 200 activates black low-power black screen display mode (as discussed in greater detail below) for the screen and prepares for writing and/or drawing inputs. When the user starts to write on the screen directly, the electronic device 200 displays the writing or drawing 220 in a color contrasting the black background (e.g., white on black as illustrated in FIGS. 2A and 2B).

The electronic device 200 may automatically save, for example, without requiring further user intervention, periodically save, and/or the user may have the option to discard or save the written input 220.

The electronic device 200 may process the written input 220 and filter the written input 220 into different categories to be handled further by a dedicated application, such as adding a phone number to contacts, creating a calendar event, etc. The electronic device 200 may save the written input 220 as text or graphics and may save the written input 220 without ever needing to fully power on the display, which may save power.

Figure 3:
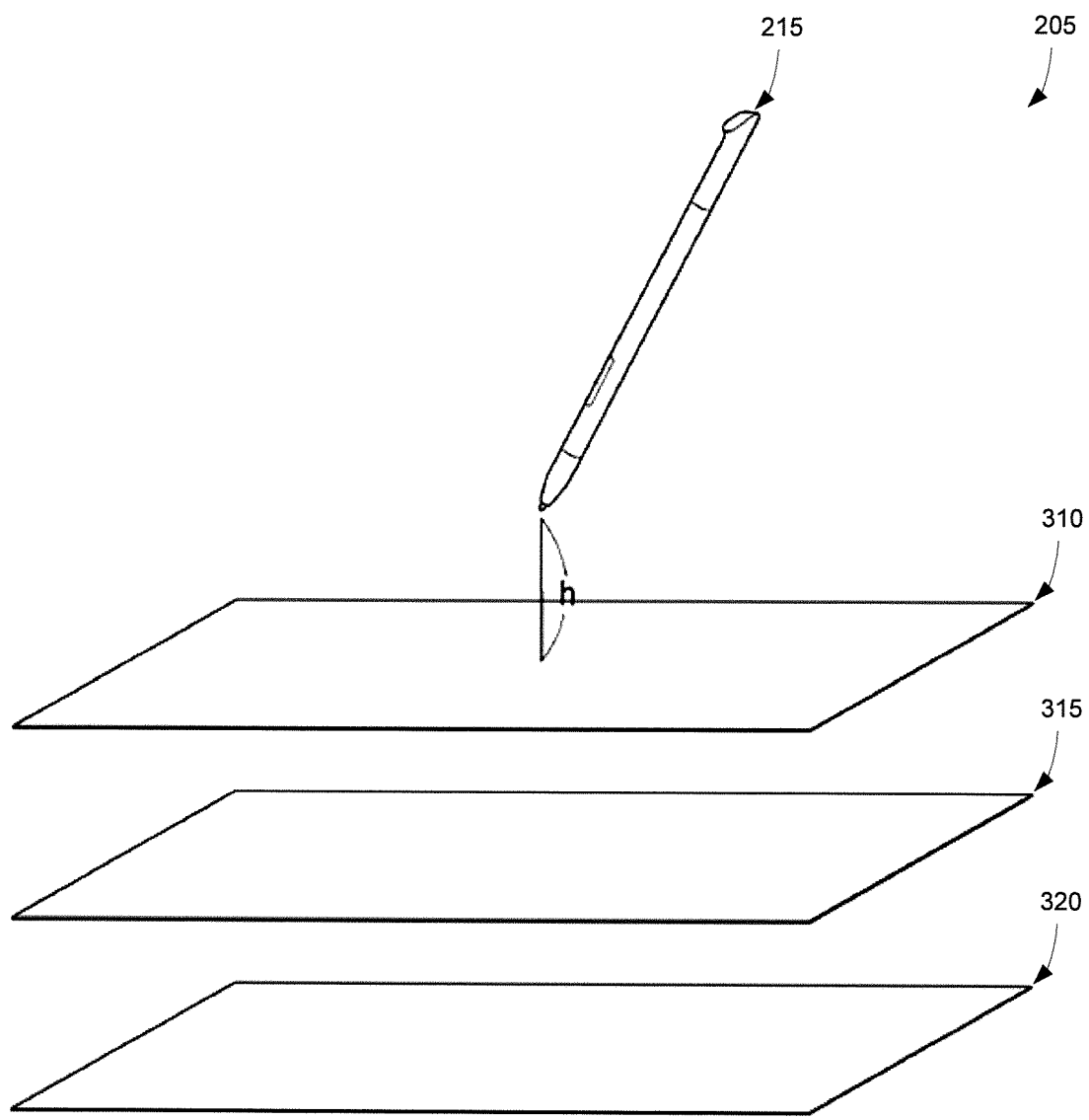
FIG. 3 illustrates an exploded view of an example screen of an electronic device for written input according to embodiments of the present disclosure.

FIG. 3 illustrates an exploded view of an example screen 205 of an electronic device for written input according to embodiments of the present disclosure. For example, the screen 205 may be an example of one embodiment of screen 205 in FIGS. 2A and 2B. In this example, screen 205 is seen from an exploded view with a surface layer 310 (e.g., a covering, such as glass or plastic) above a touchscreen 315 above a display panel 320.

The touchscreen 315 can be a capacitive touch panel obtained by coating both sides of a glass with a metal conductive material, such as Indium Tin Oxide (ITO) film to conduct a current on the surface layer 310, which can be coated again with a dielectric substance to hold charges. The touchscreen 315 may also be an electronic magnetic resonance (EMR) touch panel, including an electromagnetic inductive coil sensor having a grid structure in which a plurality of loop coils are arranged in a predetermined first direction and a second direction intersecting the first direction, and an electronic signal processor configured to sequentially provide an alternate current (AC) signal with a predetermined frequency to the loop coils of the electromagnetic inductive coil sensor. While the touchscreen 315 is illustrated as separate from and above the display panel 320, the touchscreen 315 may be integrated with or below the display panel 320 or may include two touch panels, one above and one below the display panel 320.

The touchscreen 315 can detect a hovering or touch event over or on the screen 205 and send a signal to a processor, such as, for example, processor 140 in FIG. 1 indicating a proximity of the hovering or touch event. For example, when the pen 215 is detected to be within a predetermined proximity (in this example denoted by "h") of the surface layer 310 and/or the display panel 320 of the screen 205, the electronic device 200 may activate the low-power black screen display mode for the display panel 320 to process and display written inputs on the screen 205.

While various embodiments discuss the use of an electronic pen to write on the screen of the electronic device 100, other embodiments allow for writing on the screen using a finger, thumb, or other appendage of the user or using any type of pen or stylus. For example, embodiments using an electronic pen may be advantageous to avoid accidental or unintended inputs on the screen by relying on removal and proximity of the pen for inferring the intentionality of the low-power input on the screen by the user. However, the present disclosure is not limited thereto. In various embodiments, the electronic device 100 may use inputs from one or more of the sensor(s) 165 to infer the intentionality of the low-power input on the screen using a finger, thumb, or other appendage of the user. For example, the electronic device 100 may use a proximity sensor or grip sensor to determine that the user is holding the electronic device or that the electronic device is not in an enclosed space, such as a bag or a pocket. In another example, the electronic device 100 may process images from a camera to determine that the user is looking at the electronic device (e.g., using eye detection) as a prerequisite for activating the low-power input mode of the present disclosure for the detected touch inputs.

Figure 4:
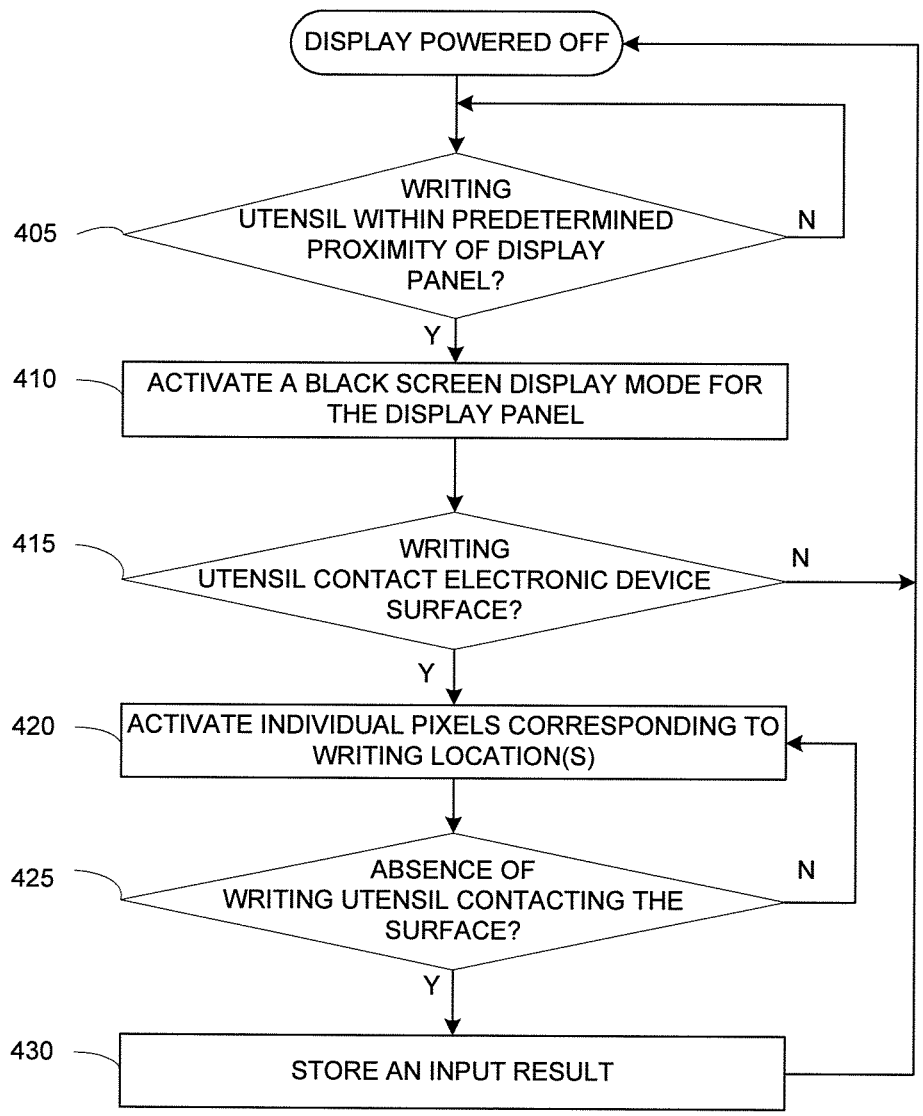
FIG. 4 illustrates a process for displaying a user input according to illustrative embodiments of this disclosure.

FIG. 4 illustrates a process for displaying a user input in accordance with various embodiments of the present disclosure. For example, the process depicted in FIG. 4 may be performed by the electronic device 100 in FIG. 1.

The process begins with the electronic device 100 determining whether a writing utensil is within a predetermined proximity of the display panel (step 405). For example, in step 405, the electronic device 100 may determine whether a writing utensil, such as, for example, a finger of a person or an electronic pen, is hovering over the screen of the electronic device, for example, while a display panel of the electronic device is powered off. For example, the electronic device may be in a low-power state with the processor running background processes and monitoring for a sensor input corresponding to proximity of a writing utensil. In this manner, the display panel, which may be one of the most significant battery loads, is powered off resulting in energy efficiency and savings.

In an example embodiment, the determination that the writing utensil is within a predetermined proximity of the display panel may be a detection by the electronic device that the electronic pen has been removed from a storage location of the electronic pen in the electronic device, for example, by using sensors proximate to this storage location or in the electronic pen. In this example, the predetermined proximity is any proximity with the electronic pen being removed from the pen's storage location. In some embodiments, the pen or the pen sensor may send a signal to the electronic device to wake the electronic device without activating the display panel. If the electronic device 100 does not detect the writing utensil within the predetermined proximity of the display panel, the electronic device 100 continues to monitor for the writing utensil with the display panel powered off.

If the electronic device 100 detects a writing utensil is within the predetermined proximity of the display panel, the electronic device 100 activates a black screen display mode for the display panel (step 410). For example, in step 410, the black screen display mode may be a low power mode where the display panel is powered on, activated, or otherwise ready to cause the individual pixels of the display panel to emit light but while the pixels are emitting light, i.e., the screen of the electronic device still appears black. For example, the electronic device may switch from a powered off mode for the display panel to this low-power black screen display mode.

Thereafter, the electronic device 100 detects whether the writing utensil contacts the surface of the electronic device (step 415). For example, in step 415, the electronic device 100 may detect locations (e.g., pixel locations) where the writing utensil contacts or comes within a second predetermined and closer proximity of the surface of the electronic device. This surface may be the screen area, e.g., the portion of the surface or glass above the display panel of the electronic device. If the electronic device 100 detects that the writing utensil does not contact the surface of the electronic device, for example, for a predetermined period of time, the electronic device 100 may return to the powered off mode for the display panel, e.g., the writing utensil may have come near the surface of the electronic device, but the user did not intend to enter a written input.

If the electronic device 100 detects the writing utensil contacting the surface of the electronic device, the electronic device 100 activates individual pixels corresponding to writing location(s) (step 420). For example, in step 420, the electronic device 100 may cause the display panel to activate pixel(s) corresponding to location(s) the writing utensil contacted on the electronic device display using a contrasting color, for example, as illustrated in FIGS. 2A and 2B. The contrasting color is a color other than black, for example, white. In this manner, the user can see the written input as the user writes, with the display using minimal or reduced power as compared to a scenario where the screen and the electronic device 100 are fully powered on, for example, when using a dedicated memo application. In some embodiments, the electronic device 100 may implement this process while fully powered on and may display the written input in the foreground above application contents, home screen contents, lock screen contents, menu contents, etc. In these embodiments, the electronic device 100 may determine the color(s) to display the written input as to contrast with the background contents.

The electronic device 100 then determines whether an absence of the writing utensil contacting the surface occurs (step 425). For example, in step 425, the electronic device 100 may monitor the written input to determine whether the written input has stopped for a predetermined period of time. If not, the electronic device 100 continues to activate individual pixels corresponding to writing location(s) in step 420.

If the electronic device 100 determines that an absence of the writing utensil contacting the surface occurred, the electronic device 100 stores an input result (step 430). For example, in step 430, the electronic device 100 may detect that the user has stopped writing on the screen and then automatically or without user intervention stores the written input. The electronic device 100 may store the written input in a memory of the electronic device, for example, a memory location corresponding to stored memo inputs, images, a user preselected folder or application, etc. The written input may be stored as text and/or as an image. For example, the electronic device 100 may perform text recognition to identify text corresponding to the written input and may store just the text, for example, in a memo application, to save storage space.

In various embodiments, the electronic device 100 stores this input result without needing to power on the display panel beyond the black screen display mode and the activated individual pixels. For example, the electronic device 100 may only use the display panel to display the written input, thus, greatly reduce the amount of power needed to enter a written input, which may otherwise involve fully powering on the display, unlocking the electronic device 100, launching an application, etc.

In some embodiments, the electronic device 100 may detect a user input to store the written input and, thereafter, store the written input as discussed above. For example, the electronic device may detect a user input contacting a predetermined storage location, e.g., a home button, preset corner of the screen, etc. In another example, this input may be a certain number of taps (e.g., a double tap). After storing the input, the electronic device 100 may return to the powered-off mode for the display device (e.g., end the display of the written input) with the process ending thereafter or continuing to monitor for the proximity detection as discussed above with respect to step 405. In another example, the electronic device 100 may detect the user unlocking or otherwise activating the electronic device 100 to power on. In this example, the electronic device may, automatically or without user intervention requesting storage of the written input, store the written input as discussed above and proceed with normal device operations.

Although FIG. 4 illustrates an example of a process for displaying user input, various changes could be made to FIG. 4. For example, while shown as a series of steps, various steps in each figure could overlap, occur in parallel, occur in a different order, occur multiple times, or not at all.

Accordingly, embodiments of the present disclosure provide for low-power written input display on an electronic device. Embodiments of the present disclosure provide a simple but powerful way for people to use their electronic devices to write on. For the electronic device equipped with a stylus or pen, as soon as a user pulls out the stylus/pen or picks up the stylus/pen, a quick writable mode can be activated on the electronic device, and the user can write on the electronic device screen right away while the electronic device is running under a low-power mode.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims are intended to invoke 35 U.S.C. § 112(f) unless the exact words "means for" are followed by a participle.

What is claimed is:

1. A method of operating an electronic device to display a user input, the method comprising:
   receiving a signal from a display panel of the electronic device that indicates a writing utensil is within a predetermined proximity of the display panel while the display panel is powered off;
   in response to the signal indicating that the writing utensil is within the predetermined proximity, activating a black screen display mode for the display panel, wherein the black screen display mode is a low power mode in which, when activated, the display panel is powered on while all pixels in the display panel are not activated and do not emit light;
   in response to detecting the writing utensil contacting a surface of the electronic device while the black screen display mode is activated, activating individual pixels corresponding to locations where the writing utensil contacted the electronic device to emit light;
   performing text recognition based on where the writing utensil contacted the electronic device to identify text;
   processing and filtering the identified text into a first category, handled by a dedicated application, of a plurality of categories; and
   storing the identified text in a memory of the electronic device, wherein the identified text is stored in a location of the memory corresponding to the dedicated application.

2. The method of claim 1, further comprising:
   in response to detecting an absence of the writing utensil contacting the surface of the electronic device for a predetermined period of time, storing an input result of the writing utensil contacting the surface of the electronic device in the memory of the electronic device without user intervention.

3. The method of claim 2, wherein storing the input result without user intervention comprises storing the input result without powering on the display panel beyond the black screen display mode and the activated individual pixels.

4. The method of claim 1, further comprising:
   in response to detecting a user input to store an input result of the writing utensil contacting the surface of the electronic device, storing the input result in the memory of the electronic device as at least one of an image or text.

5. The method of claim 1, further comprising:
   detecting that an electronic pen has been removed from a storage location of the electronic pen in the electronic device; and
   activating the black screen display mode for the display panel in response to detecting the removal of the electronic pen.

6. The method of claim 1, wherein the emitted light is in a color contrasting a color of the display panel.

7. The method of claim 1, wherein the writing utensil is one of a finger of a person and an electronic pen.

8. An electronic device comprising:
   a display panel configured to detect a writing utensil within a predetermined proximity; and
   at least one processor configured to:
     receive a signal from the display panel that indicates the writing utensil is within the predetermined proximity of the display panel while the display panel is powered off;
     activate, in response to the signal indicating that the writing utensil is within the predetermined proximity of the display panel, a black screen display mode for the display panel, wherein the black screen display mode is a low power mode in which, when activated, the display panel is powered on while all pixels in the display panel are not activated and do not emit light;
     activate, in response to detecting the writing utensil contacting a surface of the electronic device while the black screen display mode is activated, individual pixels corresponding to locations where the writing utensil contacted the electronic device to emit light;
     perform text recognition based on where the writing utensil contacted the electronic device to identify text;
     process and filter the identified text into a first category, handled by a dedicated application, of a plurality of categories; and
     store the identified text in a memory of the electronic device, wherein the identified text is stored in a location of the memory corresponding to the dedicated application.

9. The electronic device of claim 8, wherein the at least one processor is further configured to cause the memory of the electronic device to store, in response to detecting an absence of the writing utensil contacting the surface of the electronic device for a predetermined period of time, an input result of the writing utensil contacting the surface of the electronic device without user intervention.

10. The electronic device of claim 9, wherein the at least one processor is configured to cause the memory to store the input result without powering on the display panel beyond the black screen display mode and the activated individual pixels.

11. The electronic device of claim 8, wherein the at least one processor is further configured to cause the memory of the electronic device to store, in response to detecting a user input to store an input result of the writing utensil contacting the surface of the electronic device, the input result as at least one of an image or text.

12. The electronic device of claim 8, wherein the at least one processor is further configured to:
   detect that an electronic pen has been removed from a storage location of the electronic pen in the electronic device; and
   activate the black screen display mode for the display panel in response to detecting the removal of the electronic pen.

13. The electronic device of claim 8, wherein the emitted light is in a color contrasting a color of the display panel.

14. The electronic device of claim 8, wherein the writing utensil is one of a finger of a person and an electronic pen.

15. A non-transitory computer-readable medium comprising program code that, when executed by at least one processor, causes an electronic device to:
   receive a signal from a display panel of the electronic device that indicates a writing utensil is within a predetermined proximity of the display panel while the display panel is powered off;
   activate, in response to the signal indicating that the writing utensil is within the predetermined proximity of the display panel, a black screen display mode for the display panel, wherein the black screen display mode is a low power mode in which, when activated, the display panel is powered on while all pixels in the display panel are not activated and do not emit light;
   activate, in response to detecting the writing utensil contacting a surface of the electronic device while the black screen display mode is activated, individual pixels corresponding to locations where the writing utensil contacted the electronic device to emit light;
   perform text recognition based on where the writing utensil contacted the electronic device to identify text;
   process and filter the identified text into a first category, handled by a dedicated application, of a plurality of categories; and
   store the identified text in a memory of the electronic device, wherein the identified text is stored in a location of the memory corresponding to the dedicated application.

16. The computer-readable medium of claim 15, further comprising program code that, when executed by the at least one processor, causes the electronic device to store, in response to detecting an absence of the writing utensil contacting the surface of the electronic device for a predetermined period of time, an input result of the writing utensil contacting the surface of the electronic device in the memory of the electronic device without user intervention.

17. The computer-readable medium of claim 16, wherein the program code that causes the electronic device to store the input result comprises program code that when executed causes the electronic device to store the input result without powering on the display panel beyond the black screen display mode and the activated individual pixels.

18. The computer-readable medium of claim 15, further comprising program code that, when executed by the at least one processor, causes the electronic device to store, in response to detecting a user input to store an input result of the writing utensil contacting the surface of the electronic device, the input result in the memory of the electronic device as at least one of an image or text.

19. The computer-readable medium of claim 15, further comprising program code that, when executed by the at least one processor, causes the electronic device to:
   detect that an electronic pen has been removed from a storage location of the electronic pen in the electronic device; and
   activate the black screen display mode for the display panel in response to detecting the removal of the electronic pen.

20. The computer-readable medium of claim 15, wherein:
   the emitted light is in a color contrasting a color of the display panel; and
   the writing utensil is one of a finger of a person and an electronic pen.

* * * * *